Aug. 16, 1932.　　　　H. CHIBNIK　　　　1,872,072
AUXILIARY CULTIVATOR SHOVEL
Original Filed May 3, 1929
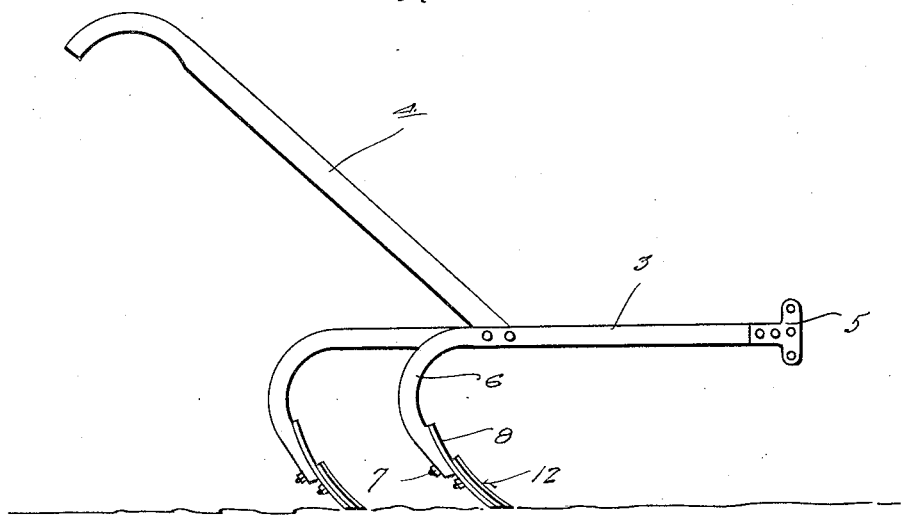
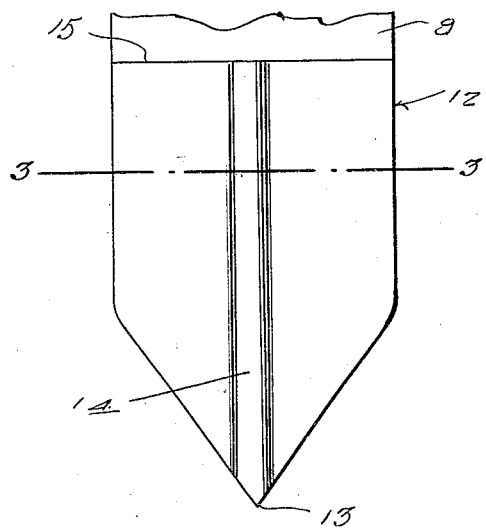
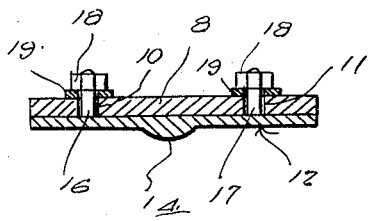
Inventor
Harry Chibnik
By Clarence A. O'Brien
Attorney Patented Aug. 16, 1932

1,872,072

UNITED STATES PATENT OFFICE

HARRY CHIBNIK, OF SIOUX FALLS, SOUTH DAKOTA, ASSIGNOR OF ONE-HALF TO W. S. REESE, OF SIOUX FALLS, SOUTH DAKOTA

AUXILIARY CULTIVATOR SHOVEL

Original application filed May 3, 1929, Serial No. 360,029. Divided and this application filed April 21, 1930, Serial No. 446,059. Renewed June 7, 1932.

This invention relates to auxiliary cultivator shovels in common with the subject matter of my application Serial No. 360,029, filed May 3, 1929, of which this present application is a division.

An object of the invention is to provide in a manner as hereinafter set forth, an auxiliary soil engaging blade for cultivators, that is reinforced to provide a thickened cutting edge and moreover to provide a blade which is not only demountable, but is adjustable with respect to the original ground engaging elements.

Another feature of the invention is to provide an auxiliary blade that may be applied directly upon the conventional type of blade in use, by merely cutting the slot in the original blade.

A still further object of the invention is to provide for replacing the blades in case of undue wear by a method which is very simple in its application.

Further objects of the invention are to provide, in a manner as hereinafter set forth, a device of the character referred to, which is strong, compact and durable, thoroughly reliable for its intended purpose, very simple to assemble on a standard cultivator, requiring very little modification thereof, and comparatively inexpensive to manufacture and install.

With the foregoing and other objects in view, the invention consists of a novel construction, combination and arrangement of parts, as will be hereinafter more specifically described and illustrated in the accompanying drawing, wherein is disclosed an embodiment of the invention, but it is to be understood that changes, variations and modifications may be resorted to without departing from the spirit of the claim hereto appended.

In the drawing:

Figure 1 is a side elevation of the conventional cultivator illustrating an adaptation therewith of the device in accordance with the present invention.

Figure 2 is a fragmentary front elevation of a cultivator shovel having the device of the present invention applied thereto.

Figure 3 is a transverse section in detail taken substantially on line 3—3 of Figure 2.

Referring to the drawing in detail, wherein is embodied a device in accordance with the present invention, 3 indicates a cultivator beam having a rearwardly and upwardly directed handle 4 attached to the beam. On the front of the beam is the conventional bracket 5 for the purpose of attaching the cultivator to the horses or tractor for the purpose of pulling the cultivator.

Depending from and secured to the rear end of the beam are shovel supports 6 that may be of any desired number.

Secured to the lower ends of the shovel supports 6 in any conventional manner, as at 7, are the original cultivator shovels 8. The original cultivator shovels 8 are of the usual configuration and terminate in a point for engaging the soil for tilling the same.

The original cultivator shovel 8 is provided with a pair of spaced, longitudinally extending, slots 10, 11, which may be formed by burning with a blow torch, or may be cut in any conventional manner. The auxiliary cultivator shovel is indicated generally at 12 and is in the form of a plate rather elongated and the same terminates at its lower end in a point 13. The outer face of the shovel 12 is formed with a semi-cylindrical enlarged rib 14 that extends along the longitudinal median of the plate from the point 13 to the upper edge 15 thereof. The enlarged rib 14 provides an increased thickness at the point of contact with the ground and provides a thickened wearing surface.

A pair of laterally projecting, transversely spaced lugs 16, 17 are anchored to the inner face of the plate 12 and projects in slidable relation through the slots 10, 11 in the original cultivator shovel 8. The lugs 16, 17 are peripherally threaded at their outer ends which project through the original cultivator shovel 8 to receive nuts 18 thereon.

Circumposed about the projecting end of the lugs 16, 17 and disposed between the inner face of the nuts 18, and the plate 8, are washers 19, which served to hold the plate 12 rigidly to the shovel 8 when the nuts 18 are drawn tight on the lugs.

The auxiliary cultivator shovel 12 is adjustable by reason of the elongated slots permitting the lugs 16, 17 to be moved when nuts 18 are loosened on the ends thereof.

From the foregoing it will be seen that I have provided an auxiliary cultivator shovel that has an enlarged rib extending longitudinally from the point to the upper edge thereof that produces a reinforcement along the longitudinal median and at the same time provides a thickened point which resists wear.

It will be readily apparent that a cultivator shovel formed in accordance with the present invention will wear materially longer than the conventional cultivator shovel by reason of the thickened portion being disposed at the greatest point of wear.

It will also be apparent that in event the point requires dressing, the rib 14 is utilizable for the entire length of a shovel which will increase the life of the shovel manyfold.

It is to be understood that by describing in detail herein any particular form, structure or arrangement, it is not intended to limit the invention beyond the terms of the claim, or the requirements of the prior art.

Having thus described my invention, what I claim is:

In combination with a cultivator shovel, an auxiliary shovel placed on the front face of the cultivator shovel, and fastened to said cultivator shovel, said auixiliary shovel having a pointed lower end and a longitudinally extending rounded rib on the front face of the auxiliary shovel and having its lower end terminating in the apex of the pointed end of the auxiliary shovel, fastening means comprising studs connected with the rear face of the auxiliary shovel and having threaded outer ends, the cultivator shovel having vertically arranged slots therein through which the studs pass, and nuts on the threaded ends of the studs.

In testimony whereof, I affix my signature.

HARRY CHIBNIK.